United States Patent [19]

Hedges

[11] 4,110,280

[45] Aug. 29, 1978

[54] METHOD FOR PREPARING EXTRUDED FASTENERS

[75] Inventor: William C. Hedges, Hampton, N.J.

[73] Assignee: Star Manufacturing Company of Oklahoma, Oklahoma City, Okla.

[21] Appl. No.: 649,963

[22] Filed: Jan. 19, 1976

[51] Int. Cl.$^2$ ............................................... B29G 2/02
[52] U.S. Cl. ................................. 264/22; 24/201 C; 260/28.5 D; 260/42.43; 260/42.45; 264/177 R; 264/211
[58] Field of Search ................. 264/22, 140, 145, 7–8, 264/151, 177 R, 211, 176 R, 252; 260/28.5 D, 42.43, 42.45; 24/201 C

[56] References Cited

U.S. PATENT DOCUMENTS

| | | | |
|---|---|---|---|
| 2,613,421 | 10/1952 | Madsen | 24/201 C |
| 2,729,608 | 1/1956 | Strain | 260/42.43 |
| 2,810,944 | 10/1957 | Sander | 24/201 C |
| 3,038,205 | 6/1962 | Plummer | 264/181 |
| 3,373,464 | 3/1968 | Ausnit | 24/201 C |
| 3,542,746 | 11/1970 | Eckardt et al. | 260/28.5 D |
| 3,600,309 | 8/1971 | Loser et al. | 264/177 R |
| 3,681,103 | 8/1972 | Brown | 204/159.19 |
| 3,718,615 | 2/1973 | Woods et al. | 260/28.5 D |
| 3,753,938 | 4/1973 | Edwards et al. | 260/28.5 D |
| 3,909,998 | 10/1975 | Simpson et al. | 52/223 L |
| 3,956,212 | 5/1976 | Sakaguchi et al. | 260/42.45 |

OTHER PUBLICATIONS

Rubber Technology–Edited by Morton, 8–1974, Neoprene and Hypalon®, pp. 322, 338–344 and 346* (electron irradiation).

*Primary Examiner*—Jeffery R. Thurlow
*Attorney, Agent, or Firm*—Hubbard, Thurman, Turner, Tucker & Glaser

[57] ABSTRACT

A method for preparing extruded fasteners is disclosed. The fasteners are prepared by extruding a composition that includes as major ingredients, chlorosulfonated polyethylene, at least one stable polymer extender, at least one fire retardant and various processing and milling aids. A method for adhering said fasteners to various substrates and other components are also disclosed.

8 Claims, No Drawings

METHOD FOR PREPARING EXTRUDED FASTENERS

BACKGROUND OF THE INVENTION

This invention relates to a method for preparing extruded fastener components. In another aspect, this invention relates to a method for preparing extruded fastener components that can be further treated to improve the memory or permanent set of the fastener components. In still another aspect, this invention relates to a method for preparing extruded fastener components that exhibit good weathering and fire-retardant properties. In yet another aspect, this invention relates to a method for adhering and joining the aforementioned fasteners and other structural members together.

Recently, there has been a considerable amount of activity in the development of new building systems. For example, a prefabricated panel system has been recently developed to take the place of conventional built-up roofing systems and conventional wall systems. In the newly-developed prefabricated panel construction system, a fluid-tight membrane forms one surface of the individual panels. In order to achieve the desired fluid-tight seal across the entire surface of the installed system, fluid-tight fastener means are attached to the edges of the individual panels and such fluid-tight fastener means mate with the adjacent fluid-tight fastener means on the contiguous panels in the system. Such a construction system is disclosed in U.S. Pat. Nos. 3,909,998 and in U.S. patent application Ser. No. 336,364, filed Feb. 27, 1973, as well as U.S. patent application Ser. No. 445,498, filed Feb. 25, 1974, issued as U.S. Pat. No. 3,935,682 on Feb. 3, 1976, and the continuation-in-part application thereof, Ser. No. 645,601 filed Dec. 31, 1975, all of which are assigned to the same assignee of the present invention and all of which are hereby incorporated by reference in this application.

In the newly developed prefabricated panelized construction system, the fastener means must be fabricated from materials that are readily available. Additionally, the materials of construction of the fastener systems must be such that the fasteners can be formed in high-speed commercial operations. Certainly, it is important that the fastener means have good weathering characteristics in all types of environment to allow them to be used in outdoor service. Since the fastener means are used as an integral part of a construction system, it is imperative that they have a high flame resistance in order to satisfy various building and insurance codes and requirements. Additionally, the materials of construction for the various fastener means should be elastic or flexible enough to allow them to be distorted for installation and yet possess enough resilience for the fastener means to return to their original preset shape to form the desired fluid-tight seal between the construction panels.

Many different types of materials have been suggested for the fabricating fasteners with the above characteristics and properties. However, it has been found that most materials, while exhibiting good properties in one particular area, are deficient in other areas.

In addition to the need for improved compositions and methods for fabricating the above mentioned fastener components, there is also a need for improved compositions and methods for affixing or adhering the fasteners to prefabricated panels used in the construction system as well as compositions and methods for adhering and joining other components of the construction system together.

SUMMARY OF THE INVENTION

Accordingly, it is an object of this invention to provide an improved method and composition for preparing extruded fasteners. It is yet another object of this invention to provide an improved composition and method for preparing extruded fastener means that can be treated to enhance their properties to be deformed for installation and returned to their original configuration to form a fluid-tight seal in a building system. It is still another object of the invention to provide improved methods and compositions for adhering fasteners to prefabricated panels used in construction systems and for adhering and joining other components of construction systems together.

Other aspects, objects and advantages of this invention will be apparent to those skilled in the art from the following description and appended claims.

In the instant invention, a composition for preparing extruded fastener components comprises a chlorosulfonated polyethylene, at least one stable polymer extender, at least one fire-retardant material and various processing and milling aids as desired. Other components, such as stabilizers, coloring aids and the like, can be added to the composition if desired. The components can be blended together and the resulting blend of materials can thereafter be extruded to form the desired fastener components or the components can be mixed with a suitable solvent and the resulting mixture of the aforesaid components and solvents can be utilized for affixing or adhering the extruded fasteners to various substrates or the resulting mixture of components and solvent can be utilized to join or adhere various other construction components together. If desired, at least a portion of the extruded fastener components can be treated by irradiation or other suitable means to cross-like or partially vulcanize the polymeric structure to improve the physical properties of the fastener components for use in a construction system.

DESCRIPTION OF PREFERRED EMBODIMENTS

In the preferred embodiments of this invention, a chlorosulfonated polyethylene resin is compounded with at least one stable polymer extender, at least one fire retardant component, and suitable processing and milling aids with the resulting combination of components either being extruded to form extruded fastener components or with the resulting combination of components being mixed with a suitable solvent material to form a putty or adhesive composition that is useful for affixing or joining various components together.

When the composition and method of this invention are used to prepare extruded fastener components useful in prefabricated construction systems, the incorporation of suitable processing aids to improve the extrudability of the composition is preferred. In such instances, it has been found that a composition that comprises 100 parts by weight of the chlorosulfonated polyethylene resin, along with about 20 to 50 parts by weight, preferably from about 30 to about 40 parts by weight of the stable polymer extender and about 75 to 150 parts by weight, preferably from about 90 to about 110 parts by weight, of suitable fire retardant components and up to about 50 parts by weight of a suitable processing or milling aid are most desirable. It will be appreciated by those skilled in the art that reference to up to about 50 parts by weight of the processing or milling aid will, of course, depend upon the extrusion conditions, as well as the particular processing and milling aids employed. Normally, from about 10 to about 50 parts by weight of the processing or milling aids will be utilized with the preferred range being about 20 to 40 parts by weight.

When the method and composition of this invention are utilized for the preparation of a putty or adhesive composition that is later utilized to adhere or join various components together in a construction system, it will not be necessary in all instances to include processing or milling aids. While these components can, of course, be present in the final putty or adhesive mixture, they can be deleted in most instances. Therefore, it has been found that a suitable putty or adhesive composition for joining or adhering various fastener materials to prefabricated panel components or for joining various construction components together can include the above mentioned composition that is used for the extrusion, either with or without the processing or milling aids, and sufficient solvent material to form a putty or adhesive that can be easily applied to the components to be joined, affixed or adhered to other components in the system.

The chlorosulfonated polyethylene utilized in the instant invention can be prepared by any suitable means known in the art and the preparation thereof does not constitute a part of this invention. It will be appreciated by those skilled in the art that chlorosulfonated polyethylene is an article of commerce and that suitable chlorosulfonated polyethylene resins for use in this invention are readily available from manufacturers such as the E. I. DuPont DeNemours Company, which markets chlorosulfonated polyethylene resin in large quantities. The trademark, "Hypalon", synthetic rubber is utilized by E. I. DuPont DeNemours Company in its marketing of chlorosulfonated polyethylene resins. Preferably, the chlorosulfonated polyethylene used in this invention will have a chlorine content of at least about 15% by weight and a sulfur content of at least about 0.5% by weight. During the compounding and extrusion, it is preferred that the chlorosulfonated polyethylene be in an unvulcanized state. It will be appreciated that the molecular weight of the chlorosulfonated polyethylene should be sufficiently high to be a rubbery solid that can be compounded with the other ingredients mentioned herein.

The compositions of the instant invention include at least on stable polymer extender or filler such as titanium dioxide, carbon black, finely ground clay and the like. It will, of course, be appreciated that any inert stable extender that is compatible with the other components of the blend can be utilized. In order to facilitate blending the filler or polymer extender with the other components to achieve a good dispersion, it is preferred that the stable polymer extenders should be finely ground prior to incorporation into the blend. One particularly preferred stable polymer extender is titanium dioxide because it is virtually inert to all weathering conditions and it produces a final product having a pleasing, white color with little or no chalking, even after extended exposure to weather conditions.

In order to satisfy the various building safety and insurance codes and regulations, suitable fire retardants are incorporated into the compositions of this invention. Therefore, at least one fire retardant material will be incorporated into the compositions. Such materials as antimony trioxide, hydrated alumina and the like, can be utilized as the fire retardant materials. Hydrated alumina has been found to be particularly useful since the hydrated alumina will decompose and give off its water of hydration as it is heated in a fire condition to cause bubbling in the polymer composition, thereby insulating the inner layer of material from the outer environment where flames are present. In addition to the above-mentioned bubbling effect, the hydrated alumina also suppresses flame propagation because the loss of water of hydration is an endothermic reaction which results in the lowering of the temperature of the composition. The lowering of the temperature of the composition thereby serves to extinguish flames. Such materials as Hydral 710, a trademark of Aluminum Company of America, for a material which is a finely-ground hydrated alumina, can be utilized most effectively in this invention. When hydrated alumina is incorporated as one of the fire retardant materials, it will normally be present in amounts of from about 75 to about 150 parts by weight with the most preferred amounts being in the range of about 90 to about 110 parts by weight. Such other flame retardant materials as antimony trioxide, phosphorous compounds, halogenated compounds and the like, can be also incorporated in the compositions along with the hydrated alumina. When such other fire retardant materials are added along with the alumina, they will normally be present in amounts of up to about 50 parts by weight. It has been found that there is a synergistic fire retarding effect in the use of halogenated compounds with antimony containing fire retardants. Therefore, the incorporation of antimony-containing materials as fire retardants is especially preferred in the instant compositions.

Various plasticizer or processing aids can be utilized to facilitate the milling, or mixing, of the foregoing components together on a suitable mixer such as a Banbury mixer and the like, as well as in the actual extrusion step when the compositions are extruded to form fastener components. Virtually any suitable processing or milling aid can be utilized so long as it is compatible with the other components of the compositions. For example, plasticizers or extrusion or milling aids such as polyethylene glycol, aromatic oils and the like, can be utilized to improve the processability and extrudability of the compositions. Normally, the processing aids will be present in an amount of from about 10 to about 50 parts by weight, with the most preferred amounts being in the range of about 20 to 40 parts by weight when the compositions are to be extruded into faster components. The incorporation of conventional processing and milling aids such as polyethylene resin will improve the extrudability and milling properties of the composition. When polyethylene resin is incorporated into the composition, it will normally be present in an amount of from about two to about ten parts by weight with the most preferred amount being in the range of about four to six parts by weight. Various plasticizers that are compatible with the overall composition can also be incorporated into the composition. For example, chlorine-containing plasticizers, such as the well known plasticizer material sold by Diamond Shamrock Company under the trademark, "Chlorowax LV", which is a chlorine-containing paraffin plasticizer are quite useful in the instant composition. "Chlorowax LV" plasticizer has been mentioned specifically because the material not only functions as an effective plasticizer, but it also functions as a flame retarding agent since it is a chlorine-containing compound.

In addition to the foregoing ingredients, it may also be desirable to incorporate other materials such as coloring agents and stabilizers into the blend. Known stabilizers such as, for example, magnesium oxide, dispersed in a mineral oil, are particularly preferred in this invention. One particular advantage of using the mineral oil dispersion of magnesium oxide as a stabilizer is the fact that the mineral oil enhances the processability and extrudability of the composition, while the magnesium imparts a good stabilizing effect to the actual compounding and to the final composition to improve its weatherability and to reduce the tendency of the final composition to "craze" which is a phenomena manifested by fine alligator skin-like cracking on the surface of the final composition when it is exposed to weathering. When magnesium oxide is incorporated into the composition, it will normally be present in an amount of from about two to about ten parts by weight with amounts of from about four to about six parts by weight being most preferred.

When the above-mentioned compositions are extruded, any suitable extrusion equipment with the necessary extrusion dies can be utilized. It has been found that by utilizing a heated extrusion die, that the surface of the extruded fastener components has a smoother finish. Normally, the die temperature should not exceed about 150° C, although higher temperatures may be used when the extrusion is carried out at high speeds.

In the mixing of the various components of the above-described compositions, conventional rubber processing procedures and equipment can be utilized. Therefore, the mixing of the components can be carried out in either internal mixers or open mills with all ingredients preferably added at the start of the mixing step. The mixing time cycle should be relatively short, consistent with good dispersion of the various components. Normally, a mixing time cycle of from about six to eight minutes with a dump temperature of below a about 140° C is preferred. It has been found that dump temperatures of about 160° C may cause increased water swelling of the final components and generally degrade the final compound. It is preferred to carry out the compounding in a basic condition. Therefore, the use of magnesium oxide as a stabilizing agent during the compounding is particularly preferred to react with chlorine or sulfur that may be liberated during the compounding steps.

When the above-described composition is extruded to form extruded fastener components, it has been found that fastener components such as those described in U.S. Pat. No. 3,909,998 and in Application Ser. No. 645,601 filed Dec. 31, 1975, which is a continuation-in-part of application Ser. No. 445,498, filed Feb. 25, 1974, issued as U.S. Pat. No. 3,935,682 on Feb. 3, 1976, both of which are incorporated by reference herein, can be extruded using conventional extrusion techniques. In those applications, extruded fastener components that include tongue and groove portions that mate with each other and web portions for affixing or joining them to various other components are described. When the fastener components, such as those described in the above-mentioned applications are extruded, it is often desirable to treat at least the tongue and groove portion of the fastener means to give the tongue and groove portions a permanent set or memory so as to improve the ultimate seal that is formed when the fastener halves are joined together. As described in the above-mentioned patents and copending patent applications, the tongue and groove portions of the fasteners can be extruded in a desired configuration and the tongue and groove portions of the fasteners can thereafter be treated by irradiation or other type of cross-linking or vulcanization treatment to increase the modulus of elasticity. Thus, after the extrusion step, the extruded fastener components can be spooled together and a portion of the fastener, e.g., the tongue and groove portion, can be subjected to an irradiation step so that Beta rays will penetrate the tongue and groove portion of the fastener but not the web portion of the fastener. When Beta radiation is utilized to treat the tongue and groove portion of the fasteners, an irradiation dose of about ten megarads, provided by a Beta electron beam of about 1.23 MEV in a single irradiation pass will provide the desired change in properties of the fastener to increase the modulus of elasticity and give the tongue and groove portion of the fastener a permanent set in the desired configuration. Instead of subjecting the tongue and groove portion of the fasteners to Beta rays, other methods for at least partially vulcanizing the tongue and groove portions of the fasteners can be utilized such as localized steam vulcanization, localized heat treatment, and the like. When the fasteners are to be joined to other structural components by heat welding or solvent welding of the web portion to the structure, complete vulcanization or cross-linking of the web portion of the fastener should be avoided.

As previously discussed, the foregoing compositions can further be modified by the incorporation of suitable solvents to produce a putty or adhesive mixture that is applicable for the affixing or joining of fastener web portions to prefabricated panels or for adhering or joining various other components of a construction system together. When the compositions of this invention are utilized for such adhesion or joining, it has been found that the incorporation of a suitable solvent to form a putty-like or semi-solid formulation can be utilized. The amount of solvent used will be sufficient to form a putty or adhesive composition of the desired fluidity or consistency for application to the particular material being joined or sealed. Any suitable solvents such as aromatic solvents, chlorinated paraffin materials and the like, can be utilized for such solvent systems. Preferably, the solvent for the chlorosulfonated polyethylene will be a volatile solvent so that the putty or semi-solid adhesive can be applied to a locus and the solvent will evaporate. Such volatile solvents that are particularly applicable to the composition and method include toluene, benzene, xylene, methylenetrichloride, 1,1,1-trichloroethane, and the like. In some instances, it may be desirable to utilize a less volatile solvent, such as toluene, to form the putty or semi-solid composition.

When putty or semi-solid compositions are desired, it, of course, will be understood that some or all of the foregoing processing aids can be omitted from the composition. Additionally, stabilizers and other components such as viscosity control agents and the like can be added to the composition to improve the shelf life, color properties and viscosity properties of the putty or semi-solid composition.

When the putty or semi-solid compositions are utilized for joining or adhering the fasteners or other components of a construction system together, they can be utilized by merely brushing or spreading the composition onto a substrate followed by the application of the other component, such as the web of the fastener, to the surface and thereafter applying pressure. In some instances, the application of pressure and heat will improve the bond of adhesion.

The above described putty or semi-solid composition is particularly useful for sealing the corners of the various individual assembled panels in the construction system disclosed in the above-described copending patent applications and issued patents. Additionally, the semi-solid compositions can be applied directly to the faces of the individual fasteners to form a permanent seal between the fastener halves. The putty or adhesive compositions of this invention are particularly well suited for sealing or adhering various construction members together since the compositions weather well and form a tight bond. For example, the compositions can be used to seal or adhere chlorosulfonated polyethylene membranes together or to other substrates such as steel, concrete and the like. Of course, as the volatile solvent evaporates from the putty composition, the putty hardens and forms a permanent bond between the components that it is in contact with.

The following example is submitted to illustrate only one of the preferred embodiments of this invention wherein a composition is formulated and thereafter extruded to produce fastener halves, such as those disclosed in the above-mentioned copending patent applications and issued patents.

One hundred parts by weight of Hypalon 45, the trademark of E. I. DuPont DeNemours and Company for a synthetic rubber which is a chlorosulfonated polyethylene was combined with four parts by weight of finely ground magnesium oxide in a mineral oil dispersion, 35 parts by weight of finely ground titanium dioxide, four parts by weight of Carbowax 4000, a trademark of Union Carbide Corp., which is polyethylene glycol, having a molecular weight of about 4,000, five parts by weight of a solid, low density polyethylene resin, and 20 parts by weight of Chlorowax LV, which is a chlorine-containing paraffin plasticizer and eight parts by weight of antimony trioxide and 95 parts by weight of finely ground Hydral 710, a trademark of Aluminum Company of America, which is hydrated alumina. The above components were mixed with two ounces of polytetrafluoroethylene per 100 pounds of the aforementioned components on a Brabender mixer until all of the components were thoroughly combined. Following the mixing, the components were extruded, using a heated extrusion die to produce fastener components such as disclosed in U.S. application Ser. No. 645,601 filed Dec. 31, 1975, and entitled, "Construction System and Fasteners Therefor." The extruded fasteners had a smooth, white finish and were very uniform with no apparent surface blemishes. Following the extrusion, the fastener halves were coiled and the tongue and groove portion of the fastener means were subjected to an irradiation dose of about 10 megarads, provided by a Beta electron beam of about 1.23 MEV in a single irradiation pass. At the completion of the irradiation step, the fasteners were cut to size and applied to the edges of separate construction panels. The panels were installed on the roof of a building and the individual zipper halves were mated together. Following exposure to the weather in an outside environment of at least a year, there was no visible evidence of surface cracking or decomposition of the separate zipper halves.

The corners of the individual panels described above were sealed with a putty made by mixing a portion of the foregoing combination of components together prior to the extrusion step with sufficient toluene to form a spreadable putty. The resulting putty was applied to the corners of the panels with a trowel to seal the portion of the roofing system where the zipper components come together. After exposure to an outside environment for at a least a year, there was no visible evidence of cracks in the seal and no leaks were observed.

It will be understood that various changes and modifications may be made in the foregoing disclosure without departing from the spirit and scope of this invention.

What is claimed is:

1. A method for forming tongue and groove fastener components comprising the steps of:
   (a) mixing together rubbery, chlorosulfonated polyethylene, at least one stable polymer extender, at least one fire retardant compound and at least one processing aid compound to form a blend; and
   (b) thereafter extruding said blend to form said fastener components.

2. The method of claim 1 wherein said chlorosulfonated polyethylene is present in an amount of about 100 parts by weight, said stable polymer extender is present in an amount of from about 20 to about 50 parts by weight, said fire retardant compound is present in an amount of from about 75 to about 150 parts by weight and said processing aid compound is present in an amount of up to about 50 parts by weight.

3. The method of claim 2 wherein said fire retardant compound includes hydrated alumina.

4. The method of claim 3 wherein said fire retardant compound includes hydrated alumina and antimony trioxide.

5. The method of claim 4 wherein said stable polymer extender includes titanium dioxide.

6. The method of claim 1 wherein at least a portion of the extruded fastener is irradiated with Beta rays to partially cross-link the tongue and groove portion of said fastener.

7. The method of claim 4 wherein at least a portion of the extruded fastener is irradiated with Beta rays to partially cross-link the tongue and groove portion of said fastener.

8. The method of claim 1 wherein said chlorosulfonated polyethylene is present in an amount of about 100 parts by weight, said stable polymer extender is present in an amount of from about 30 to about 40 parts by weight, said fire retardant compound is present in an amount of from about 90 to about 110 parts by weight and said processing aid compound is present in an amount of from about 20 to about 40 parts by weight.

* * * * *